(12) United States Patent
Ohtani et al.

(10) Patent No.: US 9,007,527 B2
(45) Date of Patent: Apr. 14, 2015

(54) IMAGING DEVICE, IMAGING SYSTEM AND IMAGING METHOD

(71) Applicant: Hitachi, Ltd., Chiyoda-ku, Tokyo (JP)

(72) Inventors: Masaki Ohtani, Tokyo (JP); Shinichiro Hirooka, Tokyo (JP); Makoto Asuka, Tokyo (JP); Takeshi Asahi, Tokyo (JP); Satoshi Nidaira, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/177,214

(22) Filed: Feb. 10, 2014

(65) Prior Publication Data

US 2014/0253807 A1    Sep. 11, 2014

(30) Foreign Application Priority Data

Mar. 5, 2013    (JP) ................................ 2013-042504

(51) Int. Cl.
*H04N 5/14*    (2006.01)
*H04N 1/38*    (2006.01)
*H04N 1/407*    (2006.01)

(52) U.S. Cl.
CPC ............... *H04N 1/38* (2013.01); *H04N 1/4074* (2013.01)

(58) Field of Classification Search
USPC ........... 348/607–621, 673–688; 382/168–172
See application file for complete search history.

(56) References Cited

U.S. PATENT DOCUMENTS

| | | | |
|---|---|---|---|
| 2007/0171286 A1* | 7/2007 | Ishii et al. | 348/239 |
| 2011/0194766 A1* | 8/2011 | Otsuki | 382/168 |

FOREIGN PATENT DOCUMENTS

| | | |
|---|---|---|
| JP | 2009-089086 A | 4/2009 |
| JP | 2010-147969 A | 7/2010 |

* cited by examiner

*Primary Examiner* — Michael Lee
(74) *Attorney, Agent, or Firm* — Miles & Stockbridge P.C.

(57) ABSTRACT

An imaging device, an image system and an imaging method in which proper image correction processing is carried out on a video signal are provided. An imaging device includes: a video signal input unit which inputs a video signal; and an image processing unit to which the video signal is inputted and which carries out correction of the video signal and outputs a corrected video signal. The image processing unit includes a histogram detection unit which divides an image area termed by the acquired video signal into plural areas, acquires a per-area histogram that is a histogram or the video signal in each of the plural areas, and finds per-area histogram data for each area based on the per-area histogram. The image processing unit carries out correction of the video signal based on a cumulative value of the per-area histogram data.

5 Claims, 7 Drawing Sheets

| AreaNo | FOG DETECTION VALUE | | PER-DIVISION-AREA FOG DETECTION RESULT |
|---|---|---|---|
| | DARK SIDE (out_d) | BRIGHT SIDE (out_l) | |
| 1 | 5 | 3 | 8 |
| 2 | 5 | 0 | 5 |
| 3 | 5 | 1 | 6 |
| 4 | 5 | 2 | 7 |
| 5 | 4 | 4 | 8 |
| 6 | 1 | 5 | 6 |
| 7 | 0 | 5 | 5 |
| 8 | 2 | 5 | 7 |
| FOG DETECTION RESULT (output) | | | 52 |

IMAGING DEVICE, IMAGING SYSTEM AND IMAGING METHOD

BACKGROUND OF THE INVENTION

1. Field of the Invention

The present invention relates to an imaging device, an image system and an imaging method.

2. Description of the Related Art

Conventionally, a device that handles video signals uses an image correction processing circuit which carries our proper signal processing on a video signal and thus provides a desired output video. For example, in the case where visibility of the video signal is lowered by the influence of fog, yellow sand, haze or the like, there is a technique of correcting the image and improving visibility via image correction processing.

FIG. 9 shows an image scene where there is no fog or the like. As a video signal histogram of the entire image in this case, a histogram in which video signals are distributed from the dark side to the bright side as shown in FIG. 10 is obtained.

Meanwhile, with respect to a scene where there is fog or the like as shown in FIG. 11, a histogram having a smaller signal range than the video signal histogram without fog or the like is obtained. When, an image is outputted based on the histogram with the smaller signal range, a video with lower visibility is provided because of lower contrast. The reference symbols det_d, det_l and width will be described later in an embodiment of the invention.

JP-A-2010-147969 is a background art to improve the lowered visibility of the image due to fog or the like.

JP-A-2010-147969 discloses that "an image correction processing circuit according to the invention comprises: an image correction unit which carries out predetermined image correction processing on an input image and generates an output image; an arithmetic unit which acquires a luminance histogram for each field of the input image and calculates two values or all three values of an average luminance value, a standard, deviation value and an intermediate value of the luminance histogram; and a correction control unit which determines whether image correction processing on the input image is needed or not and an amount of correction, based on the two values or all the three values of the average luminance value, the standard deviation value and the intermediate value of the luminance histogram calculated by the arithmetic unit, and controls the image correction unit."

In the related art, the average luminance value, the standard deviation value and the intermediate value with respect to the video signal of the entire image are used to determine whether there is fog, yellow sand, base or the like, and whether image correction processing needs to be applied to the input image or not and the amount of correction are determined.

By the way, an input image may partly include an object appearing with high luminance due to light or the like, or an object appearing with low luminance due to shadow or the like, in addition to fog. FIG. 13 shows an input image or such a scene. FIG. 14 shows a video signal histogram of the entire input image of FIG. 13. The video signal histogram shown in FIG. 14 includes both a video signal histogram with a small signal range due to the influence of fog or the like as shown in FIG. 12 and histograms on the dark side and the bright side due to the influence of the high luminance and the low luminance.

If the related art is used in such a case, fog determination and decision on the amount of correction are carried out using the histogram of the entire image and therefore the average luminance value, the standard deviation value and the intermediate value of the video signal histogram of the entire image change largely, influenced by the histograms on the dark side and the bright side due to the high luminance and the low luminance. Therefore, despite being a foggy scene, the image can be determined as not being a foggy scene and vice versa. This causes a significant fall in foggy scene discrimination accuracy. In such cases, image processing is carried out even when there is no need to carry out correction processing, and an increase in noise due to the correction processing or the like occurs.

SUMMARY OF THE INVENTION

Thus, it is an object of the invention to provide an imaging device, an imaging system and an imaging method in which proper image correction processing is carried out on a video signal.

In order to solve the foregoing problems, for example, configurations described in the accompanying claims are employed. The present application includes plural measures to solve the foregoing problems. An example of such a configuration includes: a video signal input unit which inputs a video signal, and an image processing unit to which the video signal is inputted and which carries out correction of the video signal and outputs a corrected video signal. The image processing unit includes a histogram detection unit which divides an image area formed by the acquired video signal into plural areas, acquires a per-area histogram that is a histogram of the video signal in each of the plural areas, and finds per-area histogram data for each area based on the per-area histogram. The image processing unit carries out correction of the video signal based on a cumulative value of the per-area histogram data.

According to the invention, an imaging device, an imaging system and an imaging method in which proper image correction processing is carried out on a video signal can be provided.

BRIEF DESCRIPTION OF THE DRAWINGS

FIG. 9 shows an image scene without fog or the like.

FIG. 10 shows a video signal histogram of as entire image in the case of an image scene without fog or the like.

FIG. 11 shows an image scene with fog or the like.

FIG. 12 shows a video signal histogram of an entire image without fog or the like.

DESCRIPTION OF THE PREFERRED EMBODIMENTS

Hereinafter, an embodiment will be described with the accompanying drawings.

Figure 1:
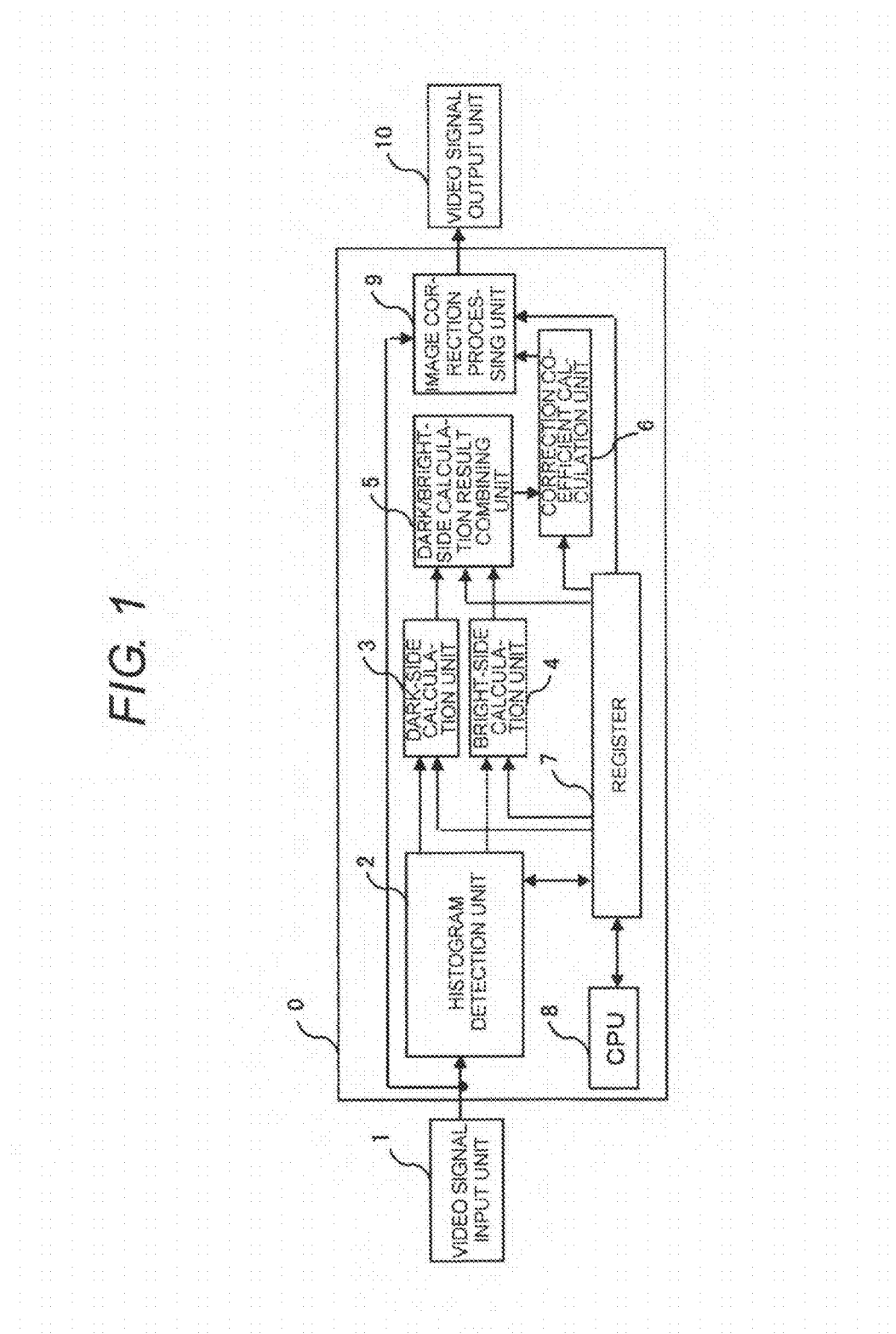
FIG. 1 is a block diagram showing the configuration of a device according to the invention.

FIG. 1 is a block diagram showing the configuration of a device according to the invention.

This block diagram includes a video signal input unit 1, a histogram detection unit 2, a dark-side calculation unit 3, a bright-side calculation unit 4, a dark/bright-side calculation result combining unit 5, a correction coefficient calculation unit 6, a register 7, CPU 8, an image correction processing unit 9, and a video signal output unit 10. Here, the histogram defection unit 2, the dark-side calculation unit 3, the bright-side calculation unit 4, the dark/bright-side calculation result combining unit 5, the correction coefficient calculation unit 6, the register 7, the CPU 8 and the image correction processing unit 9 are referred to as an image processing unit 0.

First, a video signal outputted from an imaging device, not shown, is inputted to the video signal input unit 1. At this time, as the video signal, not only a still image or dynamic image outputted from the imaging device but also a video signal in a video provided via a playback device such as DVD or the internet can be used.

The video signal inputted in the video signal input unit 1 is outputted to the histogram detection unit 2. The histogram detection unit 2 takes in histogram data of the video signal.

Figure 2A:
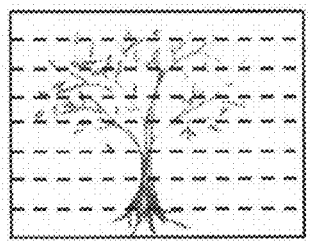
FIGS. 2A and 2B show an example of an image area division method.
Figure 2B:
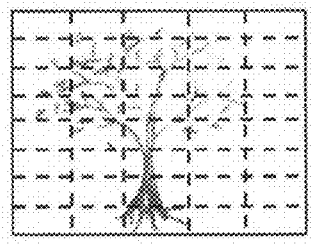

Next, the histogram detection unit 2 divides the video signal of the image into plural areas, referring to the number of divisions in the area that is set in the register 7. The number of division in the area and the range thereof, set here, are numeric values that can be set arbitrarily by the user. For example, it can be considered that the area is divided into eight in the scanning direction as shown in FIG. 2A. Also, the area can be divided in a lattice form as shown in FIG. 2B. The way of dividing the area is not limited to these. An area that is arbitrarily observed closely can be divided. For example, when there is an area where an object with randomly changing video signals (for example, a traffic signal or the like) is expected to appear, this area can be eliminated from an image area to be divided and thus eliminated from an image processing determination area.

Next, the histogram for each divided area obtained by the histogram detection unit 2 is outputted to the dark-side calculation unit 3 and the bright-side calculation unit 4. Hereinafter, the case where the histogram data is a dark-side detection value det_d and a bright-side detection value det_found by the dark-side calculation unit 3 and the bright-side calculation unit 4, will be described.

Figure 12:
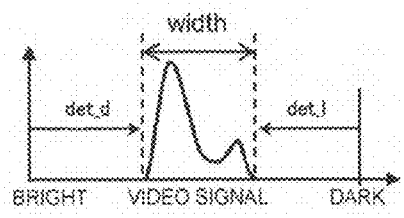

First, the dart-side calculation unit 3 and the bright-side calculation unit 4 detect the dark-side detection value det_d and the bright-side detection value det_l for each histogram for each division area. Here, the dark-side detection value det_d refers to the width from the value indicating the darkest of all the values that the video signal can have, to the point where the histogram starts, as shown in FIG. 12. The total number of the det_d and det_l data that are detected is a value that can be acquired for each division area. Therefore, the number of divisions×2 can fee acquired.

Next, based on the dark-side detection value det_d and the bright-side detection value det_l for each division area that is detected, the dark-side calculation unit 3 and the bright-side calculation unit 4 find fog defection numbers (dark-side fog detection number out_d and bright-side fog detection number out_l) with respect to the dark-side detection value det_d and the bright-side detection value det_l for each division area that is detected. The fog detection numbers express the degrees of necessity of fog correction with respect to the dark-side detection value det_d and the bright-side detection value det_l as input.

Figure 3:
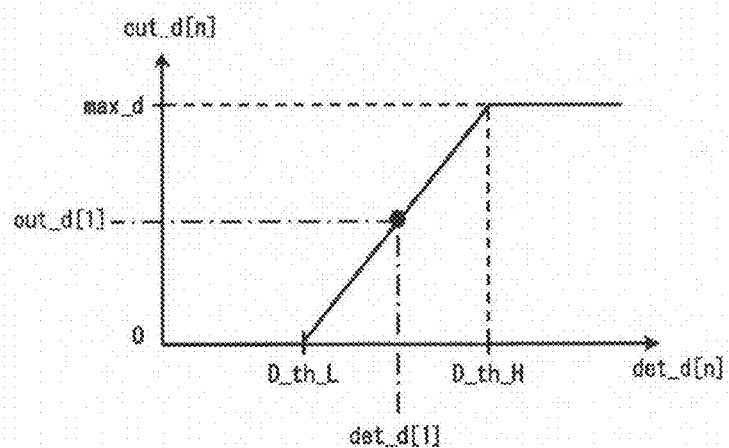
FIG. 3 shows an input/output characteristic graph with respect to dark-side detection value.

FIG. 3 shows an input/output characteristic graph 300 with respect to the dark-side detection value det_d.

The horizontal, axis represents det_d. The vertical axis represents out_d. The symbol det_d expresses the dark-side detection value. The symbol out a expresses the dark-side fog detection number with, respect to det_d. Where det_d is 0 to D_th_L, out_d=0 holds. Where det_d is D_th_L to D_th_H, out_d has a linear characteristic. Where det_t. D_th_H or higher, out_d is max_l. For example, in the input/output characteristic graph 300 of FIG. 3, in she case where the dark-side detection value is det_d[1], the dark-side fog detection number is out_d[1]. As D_th_L and D_th_H, numeric values set in the register 7 are referred to.

Figure 4:
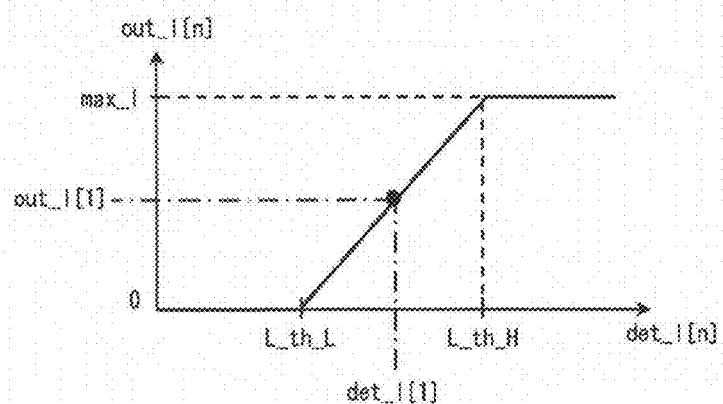
FIG. 4 shows an input/output characteristic graph with respect so bright-side detection value.

FIG. 4 shows an input/output characteristic graph 400 with respect to the bright-side detection value (det_l).

The horizontal axis represents det_l. The vertical axis represents out_l. The symbol det_l expresses the bright-side detection value. The symbol out_l expresses the bright-side fog detection number with respect to det_l. The form of the input/output characteristic graph is similar to FIG. 3. For example in the input/output characteristic graph 400, in the case where the bright-side defection value is det_l[1], the bright-side fog detection number is out_l[1]. As L_th_L and L_th_H, numeric values set in the register 7 are referred to.

Figure 5:
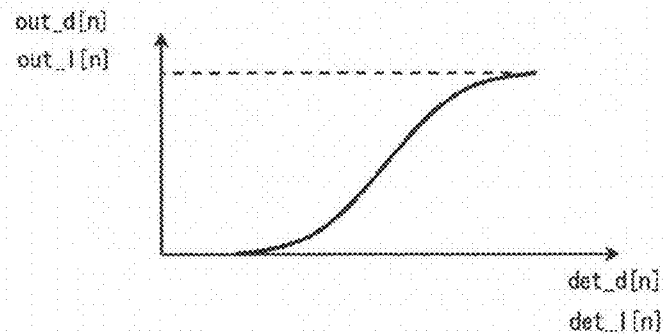
FIG. 5 shows an example of an input/output characteristic graph.

As described above, the dark-side calculation unit 3 and the bright-side calculation unit 4 find the dark-side detection value det_d and the bright-side detection value det_l for each division area and also acquires the dark-side fog detection number out_d and the bright-side fog detection number out_l with respect to the dark-side detection value det_d and the bright-side detection value det_l. The input/output characteristic graphs shown in FIGS. 3 and 4 may also be an input/output characteristic graph in the form of an inverted S-curve as shown in FIG. 5. Using such an input/output characteristic graph, a large change in the discrimination result due to a small change in the video can be restrained.

Figure 13:
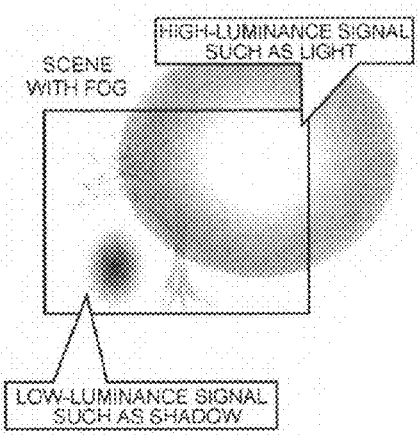
FIG. 13 shows a scene of an image partly including high luminance and low luminance.

Next, the values of the dark-side fog detection number out_d and the bright-side fog detection number out_l found for each division area are outputted to the dark/bright-side calculation result combining unit 5. The dark/bright-side calculation result combining unit 5 calculates a fog detection result output for each division area thereinafter referred to as a "per-division-area fog detection result") based on the dark-side fog detection number out_d, the bright-side fog detection number out_l and a combination ratio of these values. Here, as the combination ratio, a numeric value stored in advance in the register 7 is referred to. For example, in the case where there is a bright area combined with a dark area as shown in FIG. 13, it is desirable to set the combination ratio to 1:1 or a similar ratio.

Figures 6, 7:
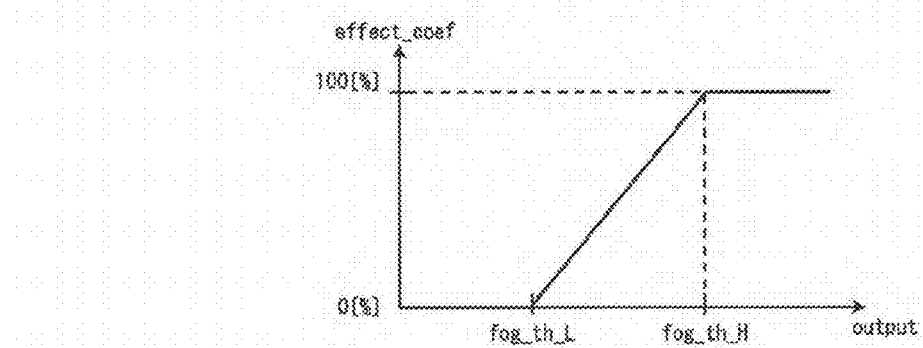
FIG. 6 is a table showing division areas, the fog detection number for each division area, and the fog detection result that is the cumulative value of dark-side fog detection numbers and bright-side fog detection numbers for each division area and the cumulative value of fog detection numbers for each division area.
FIG. 7 shows an input/output characteristic graph with respect to the result of determination on an entire screen.

FIG. 6 is a table showing division areas (AreaNo), the fog detection number for each division area, and the fog detection resale that includes the cumulative value of dark-aide fog detection numbers and bright-side fog detection numbers for each division area and the cumulative value of fog detection numbers for each division area. Here, the maximum value on each of the dark side and the bright aide is 5. If the detection value on the dark side and the bright side takes the maximum value in all the division areas, the maximum value of the fog detection result (output) is 80. AreaNo includes numbers given to the respective division areas expediently. Here, these numbers indicate that there are eight division areas in this example. Also, the fog detection numbers on the dark side and the bright side for each division area are shown. For example, for AreaNo1, the dark-side fog detection number is 5 and the bright-side fog detection number is 3. Similarly, numeric values are described for AreaNo1 to AreaNo8. The per-division-area fog detection result is the sum of the dark-side fog detection number and the bright-side fog detection number. The cumulative value of the per-division-area fog detection results is shown as the output, which is 52 in this example. The method for calculating the output is not limited to the above example. The output may be the sum of the total of the values for the dark-side areas 1 to 8 and the total of the values for she bright-side areas 1 to 8.

Next, a method correcting a video signal based on the fog detection result (output) obtained as described above will be described.

The fog detection result (output) found by the dark/bright-side calculation result combining unit 5 is inputted to the correction coefficient calculation unit 6. The correction coefficient calculation unit 6 finds the degree of necessity (effect_coef) of correction with respect to the entire input video according to the value of the fog detection result (output), using an input/output characteristic graph 500.

FIG. 7 shows the input/output characteristic graph 500 with respect to the discrimination result of the entire screen. The input/output characteristic graph 500 may also be an input/output characteristic graph in the form of an inverted S-curve as shown in FIG. 5.

With respect to the input/output characteristic graph 500, output is taken on the horizontal axis and effect_coef is taken on the vertical axis. The output is the fog detection result and the effect_coef is the degree of necessity of correction with respect to an entire input video. The effect_coef indicates that a larger video has a greater need to be corrected while a smaller video has a smaller need to be corrected. This graph is an input/output characteristic graph 700 referring to fog_th_L and fog_th_H stored in the register 7. The effect_coef is expressed, for example, by the following equation.

$$\text{effect\_coef} = \frac{\text{total of per-area fog determination values} - \text{fog\_th\_L}}{\text{fog\_th\_H} - \text{fog\_th\_L}} [\%] \quad (1)$$

The resulting effect_coef is a correction coefficient with respect to the video signal and has a value of 0 to 100%. The resulting value of the effect_coef is outputted to the image correction processing unit 9. Based on the value of the effect_coef, the image correction processing unit 9 multiplies the amount of correction by the image correction function outputted from the register 7 (for example, a numeric value expressing the amount of gain of signal amplification) by the effect_coef (0 to 100%) and thus adjusts the amount of gain that is transferred. Moreover, the video signal is multiplied by the adjusted amount of gain and the video signal is thus corrected. That is, if the amount of gain is 0, there is no change to the video signal from the video signal input unit 1. Meanwhile, if the effect_coef is 100%, there is no change in the amount of gain and the image is corrected based only on the amount of correction by the image correction function. Also, if the effect_coef is 1 to 100%, the amount of gain that is transferred is adjusted based on the value of the effect_coef and a proper amount of correct ion is obtained with respect to the video. Specifically, proper expansion of the inputted video signal is carried out. By expanding the video signal with low visibility having the histogram width narrowed by fog or the like, a video signal histogram with high visibility can be provided. The video adjusted according to the proper amount of correction with respect to the inputted video is outputted to the video signal output unit 10. The amount of correction by the image correction function may be a predetermined amount of correction, regardless of the image used. Also in this case, the predetermined amount of correction is multiplied by the effect_coef (0 to 100%).

Figure 14:
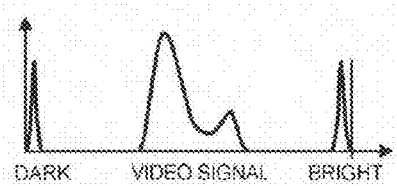
FIG. 14 shows a video signal histogram in the case where an image partly includes high luminance and low luminance.

As described above, in this embodiment, an image is divided into plural areas and the input image is corrected based on the cumulative value of histogram data for each division area. Thus, even if the image has local high luminance or low luminance, proper correction of the video signal enables provision of an image with high visibility. That is, instead of carrying out correction processing on the video signal using the histogram of the entire image, video signal correction processing on the entire image is carried cut based on the fog detection result (output) that is the cumulative value of histogram data for each division area. By employing such a configuration, the influence of a histogram due to high luminance or low luminance on the value of fog detection result (output) used for image correction processing can be reduced even if a histogram due to high luminance or low luminance appears as shown in FIG. 14. Thus, an image with high visibility can be provided via proper image processing.

The above fog detection result (output) is found based on the dark-side detection value det_d and the bright-side detection value det_l for each division area. However, in this embodiment, the method for finding the fog detection result (output) is not limited to this example. The fog detection result (output) may be found based on the average luminance value, the standard deviation, the intermediate value, the histogram width and the like of the video signal histogram in each division area, as histogram data for each division area, and the video signal may be thus corrected. Proper image processing with reduced influence of high luminance and low luminance can be carried out.

Here, the histogram width refers to the width equivalent to "width" in FIG. 12.

Figure 15:
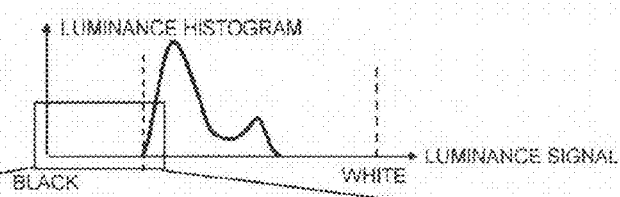
FIG. 15 shows a luminance histogram.
Figure 15:
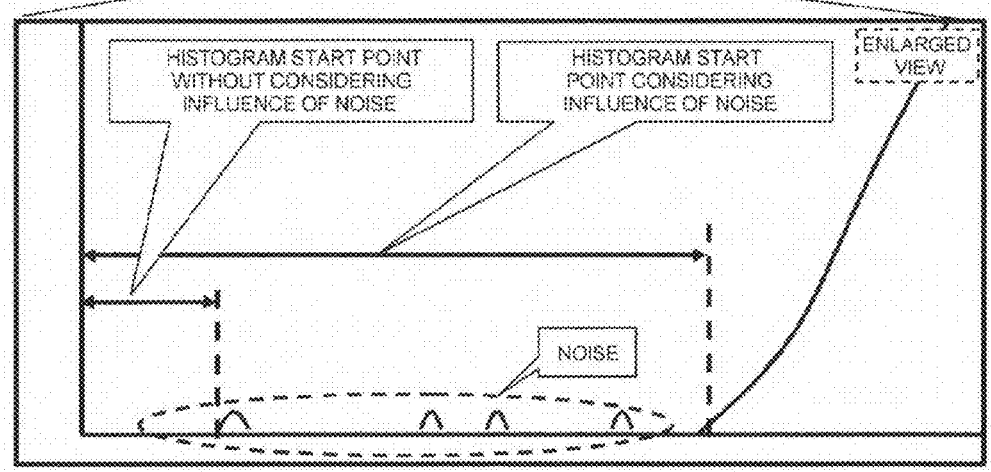

FIG. 15 shows a luminance histogram. A luminance histogram is considered to include pixels that changes instantaneously because of the influence of noise or the like. Therefore, whether a predetermined number of pixels (number of units) is continuously obtained at each luminance value or not is determined, and if the predetermined number of pixels is obtained, the histogram is determined as a luminance histogram. In the luminance histogram, of the luminance values at which the predetermined number of pixels (number of units) or more is continuously obtained, the lowest value is defined as a "histogram start point" and the highest value is defined as a "histogram end point". The difference between the histogram start point and the histogram end point is called a "histogram width (width)".

Apart from the histogram width, which is the difference between the histogram start point and the histogram end point, as described above, the fog detection result (output) can be found based on the absolute values of the histogram stare point and the histogram end point, thus correcting the video signal.

When the above configuration in which histogram data is found using the dark-side detection value det_d and the bright-side detection value det_l for each division area is used, the distribution status of the histogram (for example, whether the histogram is distributed lopsidedly on the dark side or the bright side) can be known. Therefore, by giving feedback to control such as exposure control and shutter control, it is possible to acquire an image with better visibility and to realize more proper image correction.

In the above description, an image is divided into plural areas and the input image is corrected based on the cumulative value of histogram data for each division area. However, it is also possible to weight histogram data for each division area and use the cumulative value of the histogram data of the entire screen. For example, histogram data in an image area that is an area of interest or in an area in an upper part of the screen where a distant area (that is, a foggier area) is likely to appear, can be weighted and the cumulative value of the histogram data of the entire screen can be found. Thus, it is possible to correct, the video signal in the presence of foe or the like more properly.

Hereinafter, the processing method in the above image correction processing unit will be described with reference to a flowchart.

Figure 8:
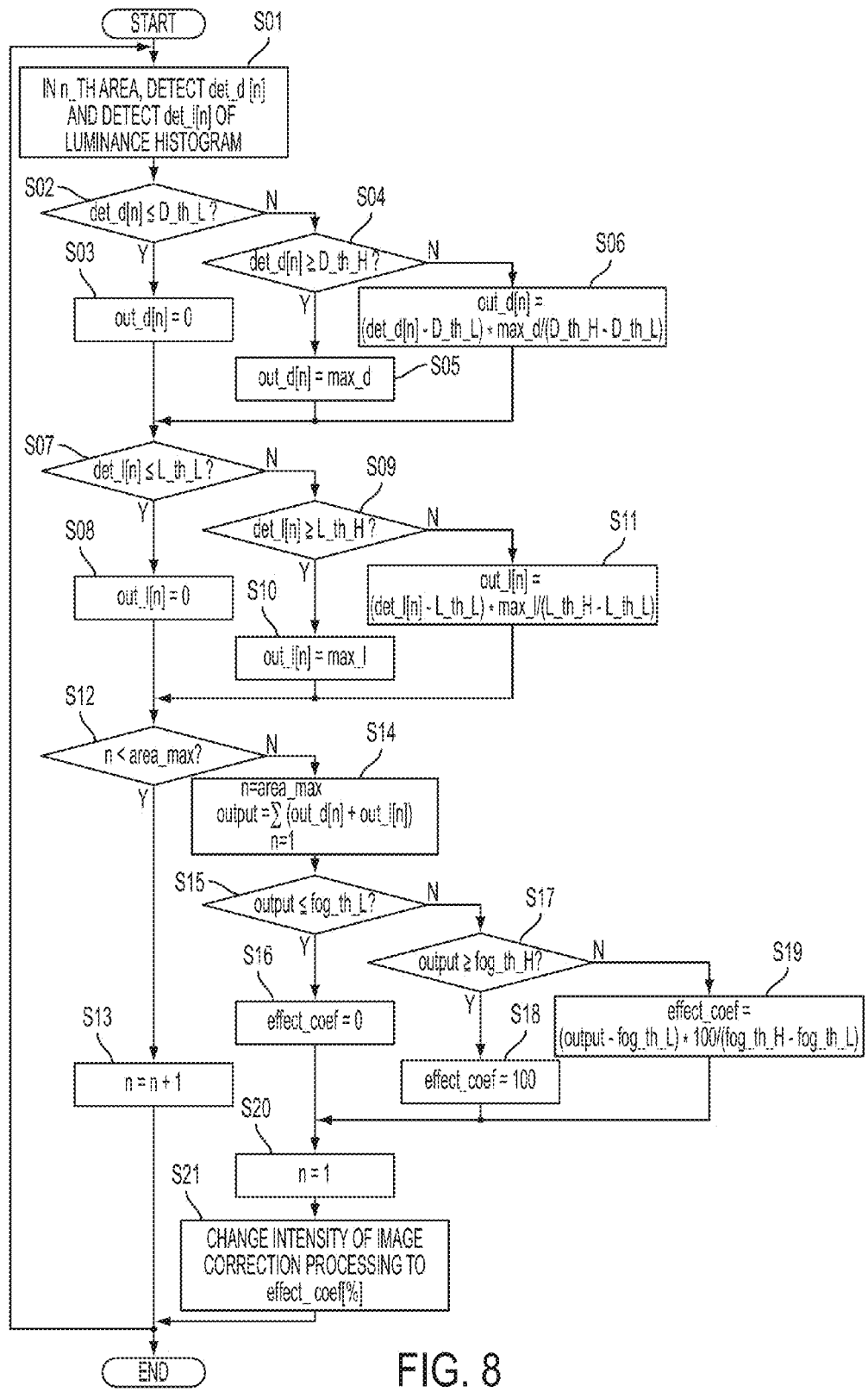
FIG. 8 is a flowchart of a processing method in an image correction processing unit.
Figure 9:
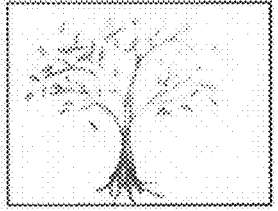
Figure 10:
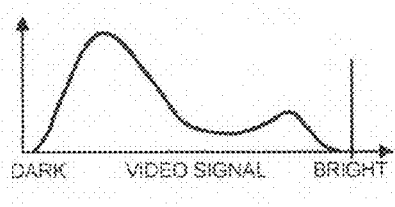
Figure 11:
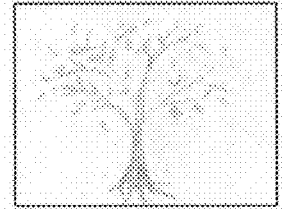

FIG. 8 is a flowchart of the processing method in the image correction processing unit.

First, in S01, the histogram detection unit 2 divides an entire image of a video signal into an arbitrary number of areas. Next, one of the histogram data detection areas is designated. The dark-side calculation unit 3 and the bright-side calculation unit 4 detect det_d and dot_l in each division area.

Next, in S02, the dark-side calculation unit 3 determines whether the detected det_d is equal to or lower than the threshold value D_th_L or not. If the result is Yes, 0 is substituted into out_d in S03. If the result is No, whether det_d is equal to or higher than the threshold value D_th_H or not is determined. If the result of this determination is Yes, max_d is substituted into out_d. If the result of the determination in S03 is N, the value of 1 to (max_d−1) is substituted, into out_d in accordance with the value of det_d in S06.

In this way, as the dark-side calculation unit 3 carries out the processing of S02 to S06, out_d with respect to det_d can be found. The input/output characteristic used in this explanation is the input/output characteristic 300 shown in FIG. 3.

As for det_l, the bright-side calculation unit 4 similarly determines whether det_l is equal to or lower than L_th_L or not. S08 to S11 are similar processing to S03 to S11, respectively, and therefore will not be described further in detail.

In this way, as the bright-side calculation unit 4 carries out the processing of S07 to S11, out_l with respect to the det_l can be found. The input/output characteristic used in this explanation is the input/output characteristic 400 shown in FIG. 4.

The processing of steps S02 to S11 corresponds to the dark-side calculation unit 3 and the bright-side calculation unit 4 in the block diagram. Here, changing the values of max_d and max_l used in steps S05 and S10 is equivalent to the combination ratio in the dark/bright-side calculation result combining unit 5.

Next, in S12, whether the number of the n-th area that is currently designated is smaller than the number of divided areas is determined. If the result of the determination is Yes, out_d and out_l are not found for all the division areas. Therefore, in S13, 1 is added to n and the processing shifts to the fog determination in the next area. Meanwhile, if the result is No, out_d and out_l are successfully found for all the division areas. Therefore; in S14, the dark/bright-side calculation result combining unit 5 adds up the values of out_d and out_l in each area and thus calculates the output.

Next, in S15, whether the output is equal to or lower than the threshold value fog_th_L or not is determined. If the result is Yes, 0 [%] is substituted into the coefficient (effect_coef) with respect to the amount of correction in the image correction processing unit 9 in S16. Meanwhile, if the result is No, whether the output is equal to or higher than fog_th_H or not is determined in S17. If the result of this determination is Yes, 100 [%] is substituted into effect_coef in S18. If the result is No in S17, the value of 1 to 99 [%] is substituted into effect_coef in accordance with the value of output in step S19. The processing of S15 to S19 is already described with respect to the case where the input/output characteristic graph 500 shown in FIG. 5 is used.

When the processing up to this point is finished, the fog determination is finished with respect to the first to n-th areas. Therefore, in order to carry out the fog determination with respect to video data of the next field, 1 is substituted into n in step S20.

Finally, the image correction processing unit 9 applies the effect_coef found in step S21 to the video signal and outputs the corrected video signal to the video signal output unit 10.

As described above, even in the case where high-luminance and low-luminance objects appear only in parts of the video and a histogram as shown in FIG. 14 is obtained as the histogram of the entire image, the adoption of the configuration described in the embodiment enables reduction in the influence of a histogram due to high luminance and low luminance. Thus, even in an environment where visibility is lowered by fog, yellow sand, haze or the like, fog determination, accuracy can be improved.

Meanwhile, if fog determination is carried out based on the histogram of an entire image as in the related art, there is a possibility that the absence of fog can be erroneously determined as the presence of fog, under the influence of the histogram due to high-luminance ant low-luminance objects present in parts of the image. Therefore, it is difficult to carry out proper fog determination.

The image correction processing unit 9 in the embodiment may be provided in the imaging device or may be provided in a server or the like connected to the imaging device via a network or the like. Also, in the case where an input signal is stored in a DVD or the like, the configuration described in the embodiment may be employed for a playback device.

What is claimed is:
1. An imaging device comprising:
a video signal input unit which inputs a video signal; and
an image processing unit to which the video signal is inputted and which carries out correction of the video signal and outputs a corrected video signal;
wherein the image processing unit
includes a histogram detection unit which divides an image area formed by the acquired video signal into plural areas, acquires a per-area histogram that is a histogram of the video signal in each of the plural areas, and finds per-area histogram data for each area based on the per-area histogram,
wherein the per-area histogram data includes a difference in luminance value from a value indicating the darkest of values that the video signal can have in the per-area histogram data to a histogram start point, and a difference in luminance value from a value indicating the brightest of the values that the video signal can have in the per-area histogram data to a histogram end point, and wherein the image processing unit further includes:
a dark-side calculation unit which finds a width from the value indicating the darkest of the values that the video signal can have in the per-area histogram data to the histogram start point;
a bright-side calculation unit which finds a width from the value indicating the brightest of the values that the video signal can have in the per-area histogram data to the histogram end point;
a dark/bright-side calculation result combining unit which carries out combination based on calculation results in the dark-side calculation unit and the bright-side calculation unit;
a correction coefficient calculation unit which carries out calculation of a correction coefficient in the case where the video signal is to be corrected, based on an output from the dark/bright-side calculation result combining unit; and
an image correction processing unit which corrects the video signal based on the correction coefficient.

2. The imaging device according to claim 1, wherein the image processing unit carries out expansion of the video signal based on the cumulative value of the per-area histogram data.

3. The imaging device according to claim 1, wherein the histogram detection unit divides an arbitrary area that is set by a user into plural areas and finds histogram data of the video signal for each of the plural areas.

4. An imaging system comprising:
a video signal input unit which inputs a video signal; and
an image processing unit to which the video signal is inputted and which carries out correction of the video signal and outputs a corrected video signal;
wherein the image processing unit
includes a histogram detection unit which divides an image area formed by the acquired video signal into plural areas, acquires a per-area histogram that is a histogram of the video signal in each of the plural areas, and finds per-area histogram data for each area based on the per-area histogram,
wherein the per-area histogram data includes a difference in luminance value from a value indicating the darkest of values that the video signal can have in the per-area histogram data to a histogram start point, and a difference in luminance value from a value indicating the brightest of the values that the video signal can have in the per-area histogram data to a histogram end point, and
wherein the image processing unit further includes:
a dark-side calculation unit which finds a width from the value indicating the darkest of the values that the video signal can have in the per-area histogram data to the histogram start point;
a bright-side calculation unit which finds a width from the value indicating the brightest of the values that the video signal can have in the per-area histogram data to the histogram end point;
a dark/bright-side calculation result combining unit which carries out combination based on calculation results in the dark-side calculation unit and the bright-side calculation unit;
a correction coefficient calculation unit which carries out calculation of a correction coefficient in the case where the video signal is to be corrected, based on an output from the dark/bright-side calculation result combining unit; and
an image correction processing unit which corrects the video signal based on the correction coefficient.

5. An imaging method comprising the steps of:
dividing an image area of an acquired video signal into plural areas, acquiring a histogram of the video signal for each of the plural areas, and finding per-area histogram data for each area based on the histogram for each area;
wherein the data per-area histogram data includes a difference in luminance value from a value indicating the darkest of values that the video signal can have in the per-area histogram data to a histogram start point, and a difference in luminance value from a value indicating the brightest of the values that the video signal can have in the per-area histogram data to a histogram end point; and
performing processing including:
finding a width from the value indicating the darkest of the values that the video signal can have in the per-area histogram data to the histogram start point;
finding a width from the value indicating the brightest of the values that the video signal can have in the per-area histogram data to the histogram end point;
carrying out combination based on the width from the value indicating the darkest of the values that the video signal can have in the per-area histogram data to the histogram start point and the width from the value indicating the brightest of the values that the video signal can have in the per-area histogram data to the histogram end point;
carrying out calculation of a correction coefficient in the case where the video signal is to be corrected, based on the combination; and
correcting the video signal based on the correction coefficient.

* * * * *